US007904070B2

(12) United States Patent
Lee et al.

(10) Patent No.: US 7,904,070 B2
(45) Date of Patent: Mar. 8, 2011

(54) METHOD AND DEVICE FOR SEARCHING AND DEALLOCATING ABNORMAL TERMINAL IN WIRELESS PORTABLE INTERNET SYSTEM

(75) Inventors: Sook-Jin Lee, Daejeon (KR); Sung-Cheol Chang, Daejeon (KR); Eun-Kyung Kim, Anseong (KR); Kyung-Soo Kim, Daejeon (KR)

(73) Assignees: Samsung Electronics Co., Ltd. (KR); Electronics and Telecommunications Research Institute (KR); Hanaro Telecom, Inc. (KR); SK Telecom Co., Ltd. (KR); KT Corporation (KR)

( * ) Notice: Subject to any disclaimer, the term of this patent is extended or adjusted under 35 U.S.C. 154(b) by 1121 days.

(21) Appl. No.: 11/636,937

(22) Filed: Dec. 11, 2006

(65) Prior Publication Data
US 2007/0155378 A1 Jul. 5, 2007

(30) Foreign Application Priority Data
Dec. 9, 2005 (KR) .................. 10-2005-0120839

(51) Int. Cl.
*H04M 3/00* (2006.01)
(52) U.S. Cl. .............. 455/418; 455/414.2; 455/416; 455/436; 455/437; 455/438; 455/439; 455/440; 455/441; 455/442; 455/443; 455/444; 455/518
(58) Field of Classification Search .......... 455/418, 455/436–444, 414.2, 416, 518
See application file for complete search history.

(56) References Cited

U.S. PATENT DOCUMENTS

| | | | | |
|---|---|---|---|---|
| 6,804,509 B1 * | 10/2004 | Okon et al. | ............... | 455/414.1 |
| 7,043,267 B1 * | 5/2006 | Saotome et al. | ............... | 455/557 |
| 7,212,803 B2 * | 5/2007 | Nagasawa et al. | ............ | 455/406 |
| 7,599,327 B2 * | 10/2009 | Zhuang | ........................ | 370/329 |
| 2003/0198179 A1 * | 10/2003 | Koo et al. | .................... | 370/208 |
| 2004/0176094 A1 * | 9/2004 | Kim et al. | .................... | 455/438 |
| 2004/0185853 A1 * | 9/2004 | Kim et al. | .................... | 455/438 |

FOREIGN PATENT DOCUMENTS

| | | |
|---|---|---|
| KR | 100194591 | 2/1999 |
| KR | 1020030058589 | 7/2003 |
| KR | 1020030064219 | 7/2003 |
| KR | 1020050063606 | 6/2005 |
| KR | 1020050079847 | 8/2005 |

OTHER PUBLICATIONS

Jong-Joon Hong et al., "A Group Key Management for Real-Time Multicasting Information Security".

* cited by examiner

*Primary Examiner* — Rafael Pérez-Gutiérrez
*Assistant Examiner* — Liton Miah
(74) *Attorney, Agent, or Firm* — The Farrell Law Firm, P.C.

(57) ABSTRACT

The present invention relates to a method for searching and releasing an abnormal subscriber station in a wireless portable Internet system, and an apparatus using the same. The apparatus searches for an abnormal group including abnormal subscriber stations based on a ranging code provided in a periodic ranging process, and searches for an abnormal subscriber station by transmitting a connection maintenance message to subscriber stations included in the abnormal group so as to check an operation status of the respective subscriber stations. In addition, the apparatus releases a connection of an abnormal subscriber station. Therefore, waste of radio resources allocated to the abnormal subscriber station can be prevented, thereby achieving efficient resource management. Further, a secondary search process is performed only for subscriber stations included in an abnormal group, thereby preventing a system load from occurring when searching for an abnormal subscriber station.

9 Claims, 11 Drawing Sheets

METHOD AND DEVICE FOR SEARCHING AND DEALLOCATING ABNORMAL TERMINAL IN WIRELESS PORTABLE INTERNET SYSTEM

PRIORITY

This application claims priority under 35 U.S.C. §119 to a Korean application filed in the Korean Intellectual Property office on Dec. 9, 2005 and allocated Ser. No. 10-2005-0120839, the contents of which are incorporated herein by reference.

BACKGROUND OF THE INVENTION (a) Field of the Invention

The present invention relates to a wireless portable Internet system. More particularly, the present invention relates to a method for searching and releasing an abnormal subscriber station in a wireless portable Internet system, and an apparatus using the same.

(b) Description of the Related Art

As next-generation communication technology, a wireless portable Internet further provides mobility to a local data communication system, such as a conventional wireless local area network (LAN), using a stationary access point.

A wireless portable Internet system developed by the IEEE 802.16 group supports mobility of a subscriber station when the subscriber station moves from a cell served by a first base station to another cell served by a second base station so that it provides seamless data communication services. A mobile communication system including such a wireless portable Internet is being developed to a communication system that can support a voice service as well as a high speed packet data service.

In the wireless portable Internet system, a subscriber station must perform a ranging function so as to access an access point (AP), that is, a base station. The ranging function in the wireless portable Internet system adjusts transmit power, transmit timing, and frequency offset of an uplink so that the AP can successfully receive data transmitted from the subscriber station. Therefore, when the subscriber station periodically transmits a code division multiple access (CDMA) code, the base station receives the CDMA code, measures and adjusts transmit power, transmit timing, and frequency offset, and transmits an adjustment value to the subscriber station. Herein, the adjustment value includes transmit power, transmit timing, and frequency offset that have been adjusted to be included within a range for precise data receiving.

As described, although the subscriber station periodically reports a status of the subscriber station to the base station by using the ranging function, the base station does not know whether a currently accessing subscriber station abnormally releases a call, and accordingly, the base station continuously manages resources for the subscriber station, thereby causing inefficient resource management and radio resource waste.

Therefore, an algorithm for checking a status of a subscriber station by using a subscriber status check message so as to check the status of a currently connected subscriber is required. However, a current specification of the IEEE 802.16e does not define a message for checking the status of a subscriber station.

Even if a message for checking a status of a subscriber station existed, a load to check a subscriber station status may increase when too many subscriber stations are currently being served, and radio resource waste may occur when transmitting the message to all subscriber stations.

SUMMARY OF THE INVENTION

The present invention has been made in an effort to provide a method for efficiently checking an operation status of a subscriber station in a wireless portable Internet system so as to release an abnormal subscriber station, and an apparatus using the same.

In addition, radio resources allocated to an abnormal subscriber station can be prevented from being wasted, thereby increasing efficiency in radio resource management according to the present invention.

An exemplary method according to one embodiment of the present invention searches and releases an abnormal subscriber station in a wireless portable Internet system.

The method includes: a) allocating one group number among periodic ranging code groups to a subscriber station upon a ranging request of a subscriber station, and transmitting the allocated group number and the corresponding ranging code to the subscriber station; b) determining a code group including the ranging code with a ranging request message including the ranging code is transmitted from a subscriber station; c) classifying and processing a ranging request message for the respective code groups and searching for an abnormal group including an abnormal subscriber station among the code groups; d) transmitting a connection maintenance request message to subscriber stations included in the abnormal group to determine an operation status of the respective subscriber stations and searching for an abnormal subscriber station; and e) releasing a connection of the abnormal subscriber station.

An exemplary apparatus according to another embodiment of the present invention searches for an abnormal subscriber station and releases the abnormal subscriber station in a wireless portable Internet system. The apparatus includes an access controller and an access traffic processor the access controller allocates one group number among periodic ranging code group numbers to a subscriber station upon a ranging request of the subscriber station, and transmits the allocated group number and the corresponding ranging code to the subscriber station. The access traffic processor searches for an abnormal subscriber station based on a ranging request message including the ranging code when the ranging request message is transmitted from a subscriber station. In this case, the access traffic processor includes a first search processing module and a second search processing module. The first search processing module classifies and processes the ranging request message for each code group and searches for an abnormal group including an abnormal subscriber station among the code groups. The second search processing module transmits a connection maintenance message for determining an operation status of each of the subscriber stations to subscriber stations included in the abnormal group, and searches for an abnormal subscriber station.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In addition, unless explicitly described to the contrary, the word "comprise" and variations such as "comprises" and "comprising" will be understood to imply the inclusion of stated elements but not the exclusion of any other elements.

Further, throughout this specification and the claims which follow, each block is a unit that performs a specific function or operation, and can be realized by hardware or software, or a combination of both.

Figure 1:
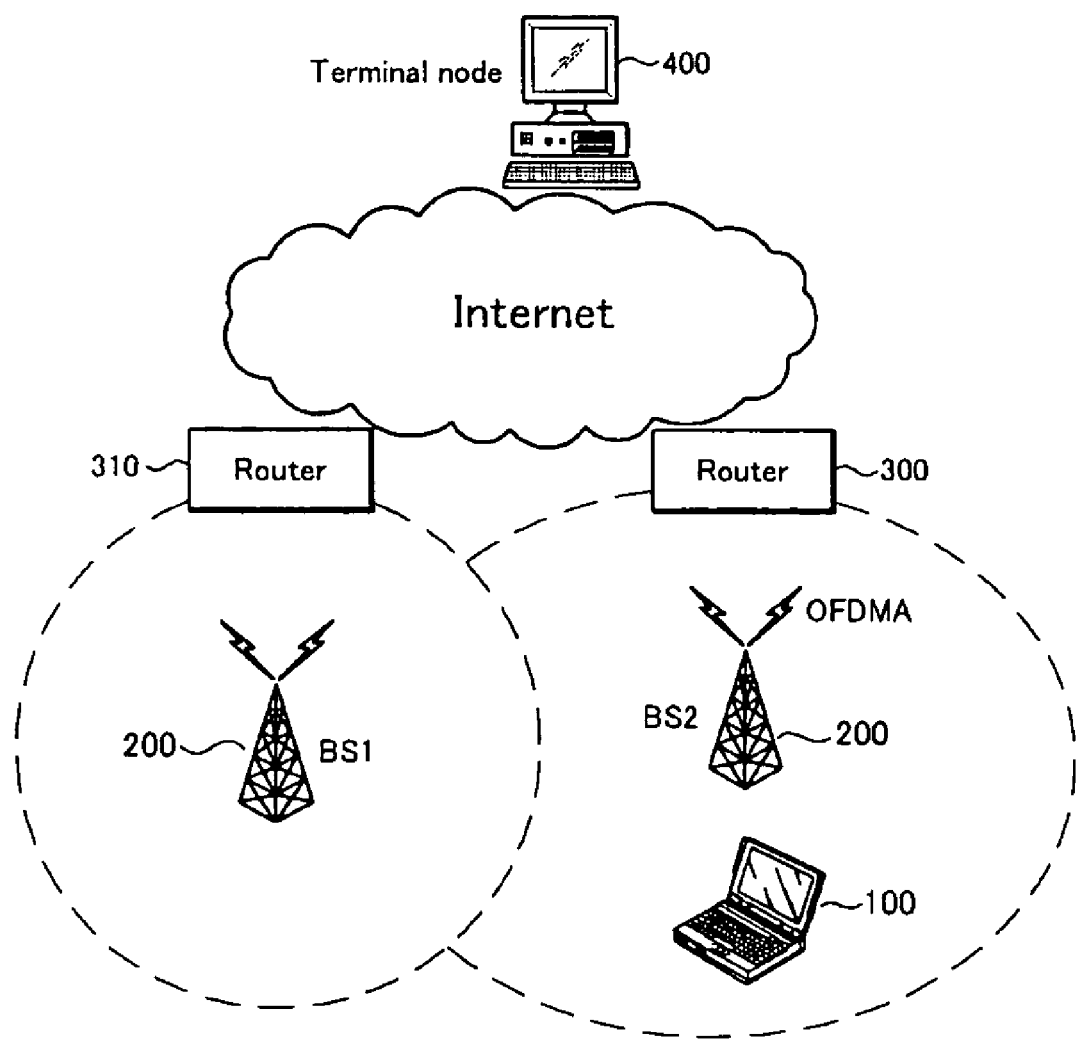
FIG. 1 is a schematic diagram of a wireless portable Internet according to an exemplary embodiment of the present invention.

FIG. 1 schematically shows a structure of a wireless portable Internet system according to an exemplary embodiment of the present invention. The wireless portable Internet system includes base stations 100 and 100', a subscriber station 200 wirelessly communicating with the base station, routers 300 and 310 accessing the base station through a gateway, and an Internet.

The portable Internet system supports mobility when the subscriber station 200 of FIG. 1 moves to a cell served by the access station 100' from a cell served by the base station 100 to provide seamless data communication services, supports a handover of the subscriber station 200 similar to a mobile communication service, and performs dynamic IP allocation according to movement of the subscriber station.

Herein, the subscriber station 200 and the access stations 100 and 100' respectively communicate with each other using an orthogonal frequency division multiple access (OFDMA) scheme, and it is not restricted thereto.

Figure 2:
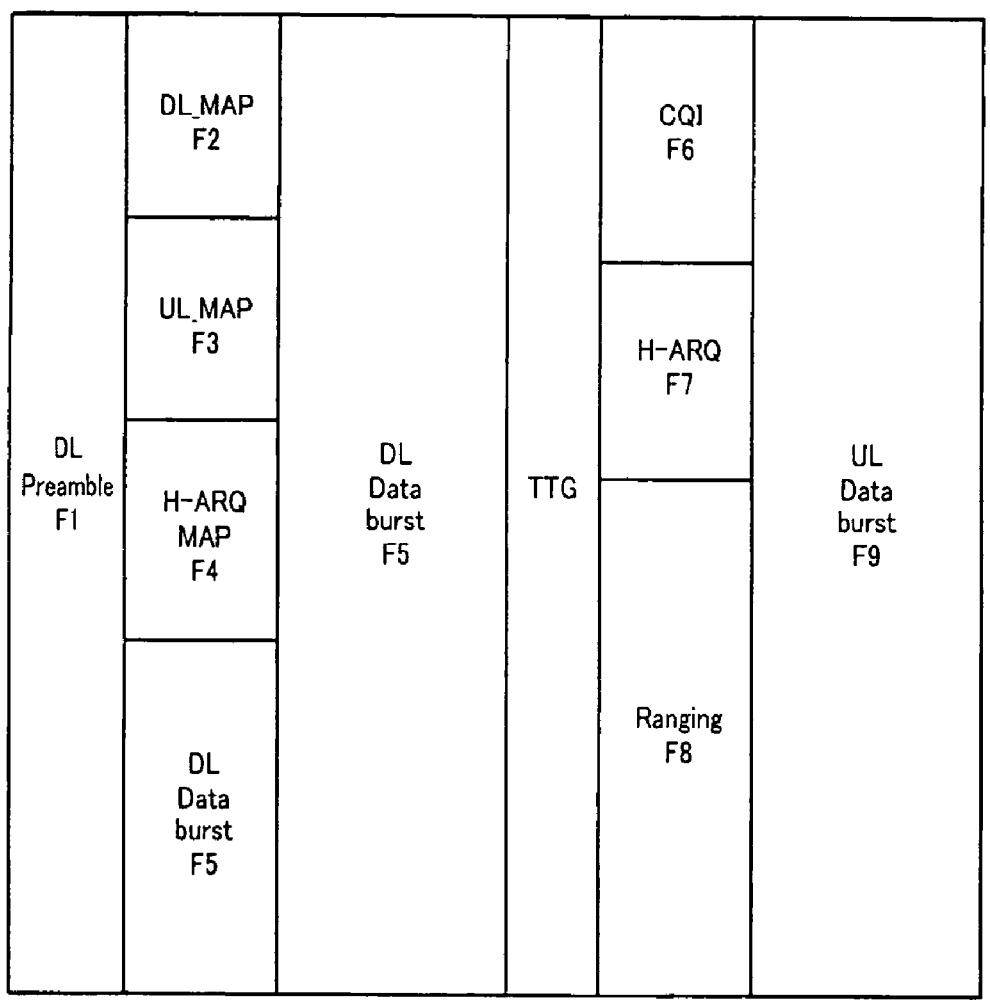
FIG. 2 is a frame configuration diagram of the wireless portable Internet according to the exemplary embodiment of the present invention.

FIG. 2 shows a frame structure of the wireless portable Internet system according to the exemplary embodiment of the present invention. As shown in FIG. 2, a frame is divided into downlink fields F1 to F5, control fields F6 to F8, and an uplink field F9, and is transmitted with a predetermined interval (e.g., 5 ms).

The downlink field is formed of a downlink (DL) preamble field F1 for DL synchronization and signal strength, a DL_MAP field F2 for transmitting DL traffic information as a DIUC value, an UL_MAP field F3 for transmitting UL traffic information as an uplink usage code (ULUC) value, a hybrid automatic repeat request (HARQ) MAP field F4 for respectively transmitting DL traffic and UL traffic as an Nep value and an Nsch value based on a channel quality indicator (CQI) value, and a DL data burst for transmitting substantial traffic.

The control field is formed of a CQI field F6 for reporting channel quality of a subscriber station that is currently served, a HARQ field F7 for controlling errors based on cyclic error checking (CRC) error in a physical layer, reported from the subscriber station, and a ranging field F8 for performing a ranging function. The UL field is a field F9 in which the subscriber Station transmits UL_MAP-specified traffic.

Figure 3:
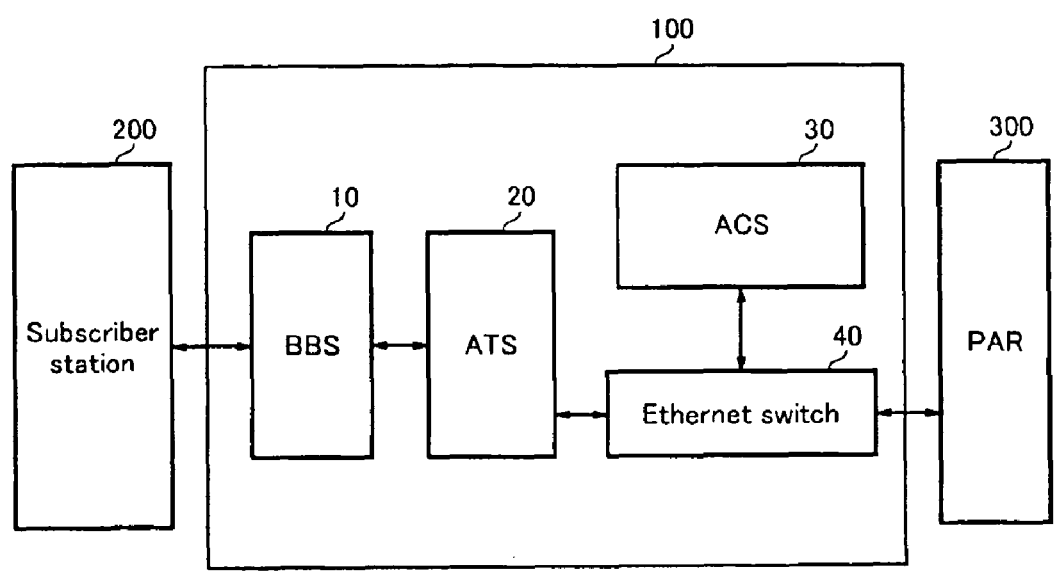
FIG. 3 is a configuration diagram of a base station according to the exemplary embodiment of the present invention.

FIG. 3 shows a structure of an access station that controls wireless portable Internet access of the subscriber station in the wireless portable Internet system according to the exemplary embodiment of the present invention.

As shown in FIG. 3, the access point 100 according to the exemplary embodiment of the present invention includes a baseband subsystem (BBS) 10 for wirelessly communicating with a subscriber station, an access traffic subsystem (ATS) 20 for processing traffic and controlling wireless transmission/receiving, an access controller subsystem (ACS) 30 for managing a user and a cell, and an Ethernet 40 for communication with the router 300.

The access traffic subsystem (ATS) 20 performs traffic processing and a radio link transmission/receiving control function, and particularly performs a MAP-based switching process with the following structure.

Figure 4:
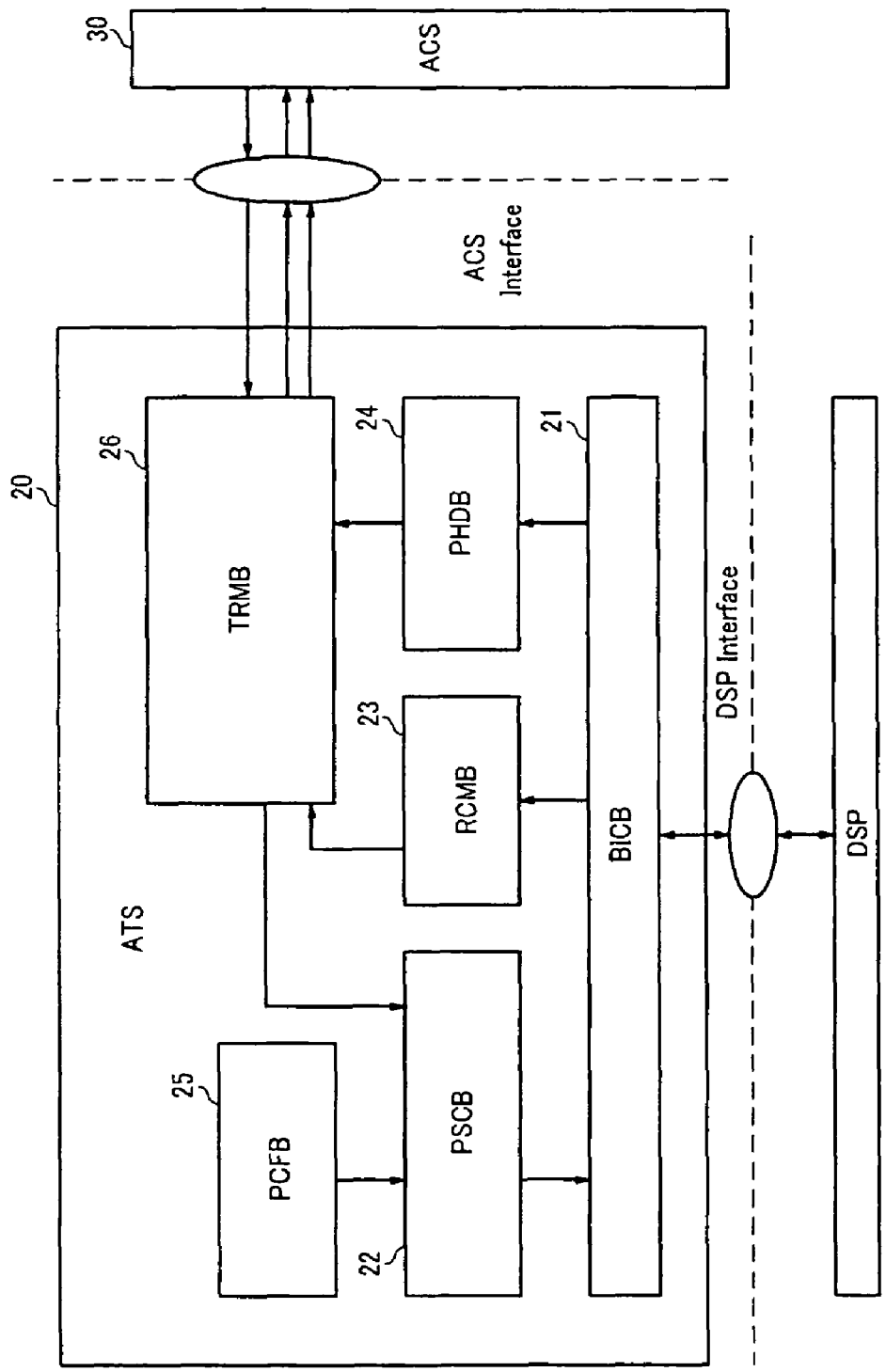
FIG. 4 is a detailed configuration diagram of an access traffic control system (ATS) of FIG. 3.

FIG. 4 shows a structure of an ATS according to an exemplary embodiment of the present invention.

As shown in FIG. 4, the ATS 20 according to the exemplary embodiment of the present invention performs an interface function, and particularly, it includes a digital signal processing interface control block (DICB) 21 for performing an interface function with a digital signal processing (DSP), a packet scheduling block (PSCB) 22, a radio channel management block (RCMB) 23, a packet handling block (PHDB) 24 forming a packet data unit (PDU) to be transmitted through a radio channel, a packet classification block (PCFB) 25 for classifying packets and mapping a connection identifier (CID) of a received packet, and a traffic resource management block (TRMB) 26 for processing a control message transmitted from the ACS 30 and managing ATS resources.

In the present exemplary embodiment, the PCFB 25 classifies received packets and identifies a terminal by using a CID, but it is not limited thereto. The CID indicating a one-directional medium access control (MAC) address for identifying a connection of peer-to-peer layers within MAC layers of the base station and the subscriber station.

With this configuration, the ATS 20 performs packet scheduling, radio bandwidth allocation, and ranging for efficient management of radio resources, and the RCMB 23 that searches an abnormal terminal during a ranging process is formed of the following structure.

Figure 5:
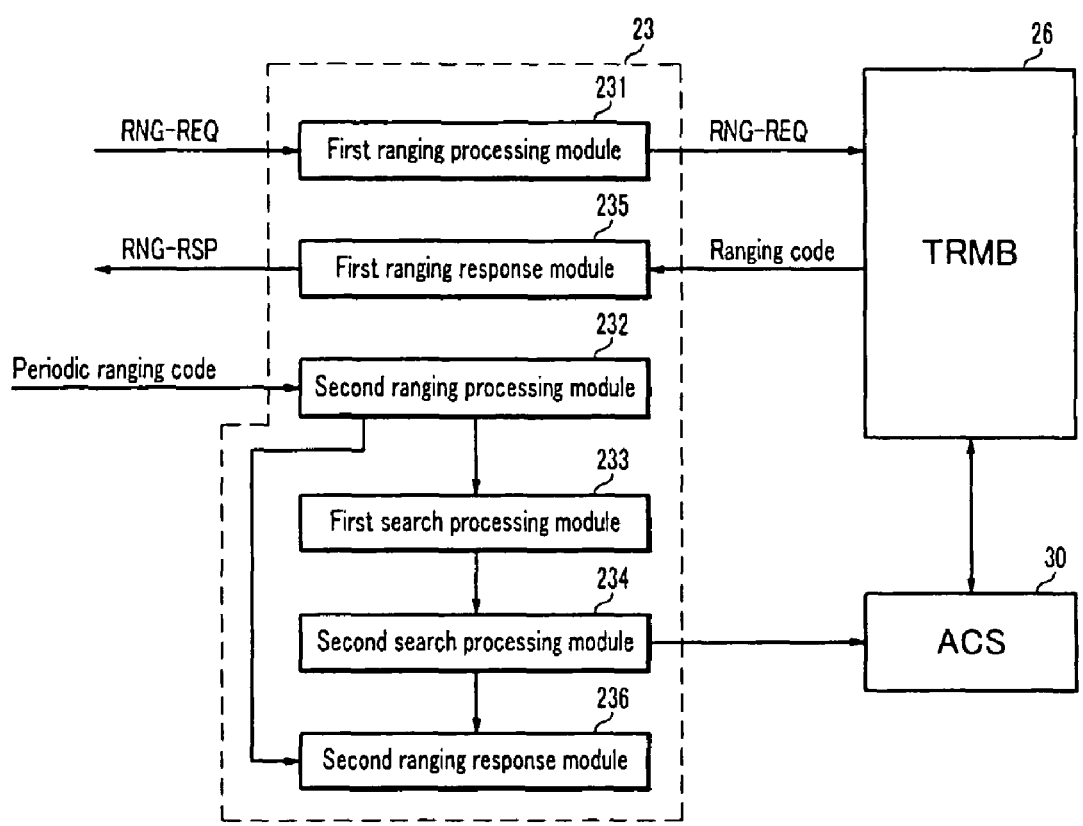
FIG. 5 is a detailed configuration diagram of a radio channel management block (RCMB) of FIG. 4.

FIG. 5 is a configuration diagram of an RCMB according to the exemplary embodiment of the present invention.

The RCMB 23 performs an initial code access function for processing initial access for a subscriber station, a periodic ranging code access processing function for periodic ranging code access processing requested by the subscriber station, and a ranging request processing function for processing a ranging request received after the initial ranging access, and particularly, the RCMB 23 performs a primary search function and a secondary search function by interacting with the TRMB 26 upon the periodic ranging request of the subscriber station according to the exemplary embodiment of the present invention. The primary search function is performed for searching a group including an abnormal subscriber station, and the secondary search function is performed to search an abnormal subscriber station in the searched group.

Therefore, the RCMB 23 includes a first ranging processing module 231 for processing initial ranging from a subscriber station, a second ranging processing module 232 for processing periodic ranging of the subscriber station, a first search processing module 233, a second search processing module 234, a first ranging response module 235 for performing a response process for an initial ranging request, and a second ranging response module 236 for performing a response process for periodic ranging.

The first ranging processing module 231 and the first ranging response module 235 may be grouped as a first ranging module, and the second ranging process module 235 and the second ranging response module 236 are grouped as a second ranging module. Particularly, the second ranging processing module may send a response message to the subscriber station, responding to a ranging request message including a ranging code. The response message includes transmit power, transmit timing, and frequency offset of an uplink.

The TRMB 26 performs a ranging process and a terminal search by interacting with the above-described RCMB 23, and when an abnormal terminal is searched as a result of the primary and secondary search functions of the RCMB 23, the TRMB 26 transmits information on the searched terminal to the ACS 30 so as to release access of the terminal.

In the exemplary embodiment of the present invention, the ACS 30 and the ATS 20 perform as abnormal terminal search and release devices, and may be respectively called an access controller and an access traffic processor, as necessary.

The abnormal terminal refers to a terminal whose connection is released without a normal release process, and it is not limited thereto. When such an abnormal terminal exists, wired resources (e.g., a transport ID) may become insufficient when the base station continuously allocates necessary resources to the terminal, and therefore such an abnormal terminal is searched and released according to the exemplary embodiment of the present invention.

Based on the above-described structure, a method for determining a terminal operation state and releasing the terminal according to a result of the determination in the wireless portable internal system according to the exemplary embodiment of the present invention will be described.

A general ranging process in the wireless portable Internet system includes an initial stage and a later stage. During the initial ranging period, a subscriber station randomly selects a resource among uplink resources provided from a base station and transmits a ranging code (e.g., CDMA code) allocated to the subscriber station by using the selected resource for initial access to the base station, and during the later stage of the ranging period, the subscriber station receives and processes a ranging response (RNG_RSP) message from the base station that has received the ranging code and adjusts transmit power, transmit timing, and frequency offset of an uplink. The subscriber station periodically performs such a ranging period.

The base station can demodulate received data only when data transmitted from all subscribers are received within a guard time. When data of one terminal is not received within the guard time, data of other subscriber stations also cannot be received. Therefore, a subscriber must periodically transmit a ranging code so as to adjust timing and power of the subscriber station.

In this case, a periodic ranging code is used. The periodic ranging code includes only a frame number (FrameNumber), a symbol index (symbolIndex), a sub-channel index (sub-ChannelIndex), and a code index (codeIndex), and therefore the base station cannot identifier a subscriber by using only the ranging code. Accordingly, the base station cannot search for a subscriber that performs an abnormal operation (hereinafter, called an abnormal subscriber station) by using only a conventional periodic ranging function.

Therefore, according to the exemplary embodiment of the present invention, one group number is allocated to a subscriber among periodic ranging code groups that can be currently used by a base station and the allocated group number is transmitted to the subscriber station through a RNG_RSP message when the subscriber station requests call access from the base station. Herein, each of the code groups is formed of a plurality of periodic ranging codes, and is allocated with a predetermined group number.

When receiving the RNG_RSP message, the subscriber station performing ranging by using a ranging code included in the corresponding code group based on the allocated group number. The base station organizes ranging codes transmitted from terminals for each group, and applies ranging code information of each group to a ranging code group search algorithm according to the exemplary embodiment of the present invention so as to search for a group including an abnormal subscriber station. In this case, the group including the abnormal subscriber station may be called an abnormal group.

Such a group search may include searching for a group including an abnormal subscriber, but it cannot precisely search for an abnormal subscriber station in the corresponding group. Therefore, a predetermined message (Keep_Alive_Reg) is transmitted to all subscriber stations in the abnormal group, and a subscriber station that does not respond to the Keep_Alive_Reg message is determined to be an abnormal subscriber station.

When an abnormal subscriber is searched through the search process, a connection of the abnormal subscriber station is released so as to prevent resource waste caused by existence of the abnormal subscriber station, thereby efficiently using resources. In addition, a group including an abnormal subscriber station is primarily searched through a ranging function, and an abnormal subscriber station is searched from among subscriber stations included in the searched group based on a message so that a system load can be efficiently reduced, compared to performing a message-based searching process for all subscriber stations.

Figure 6:
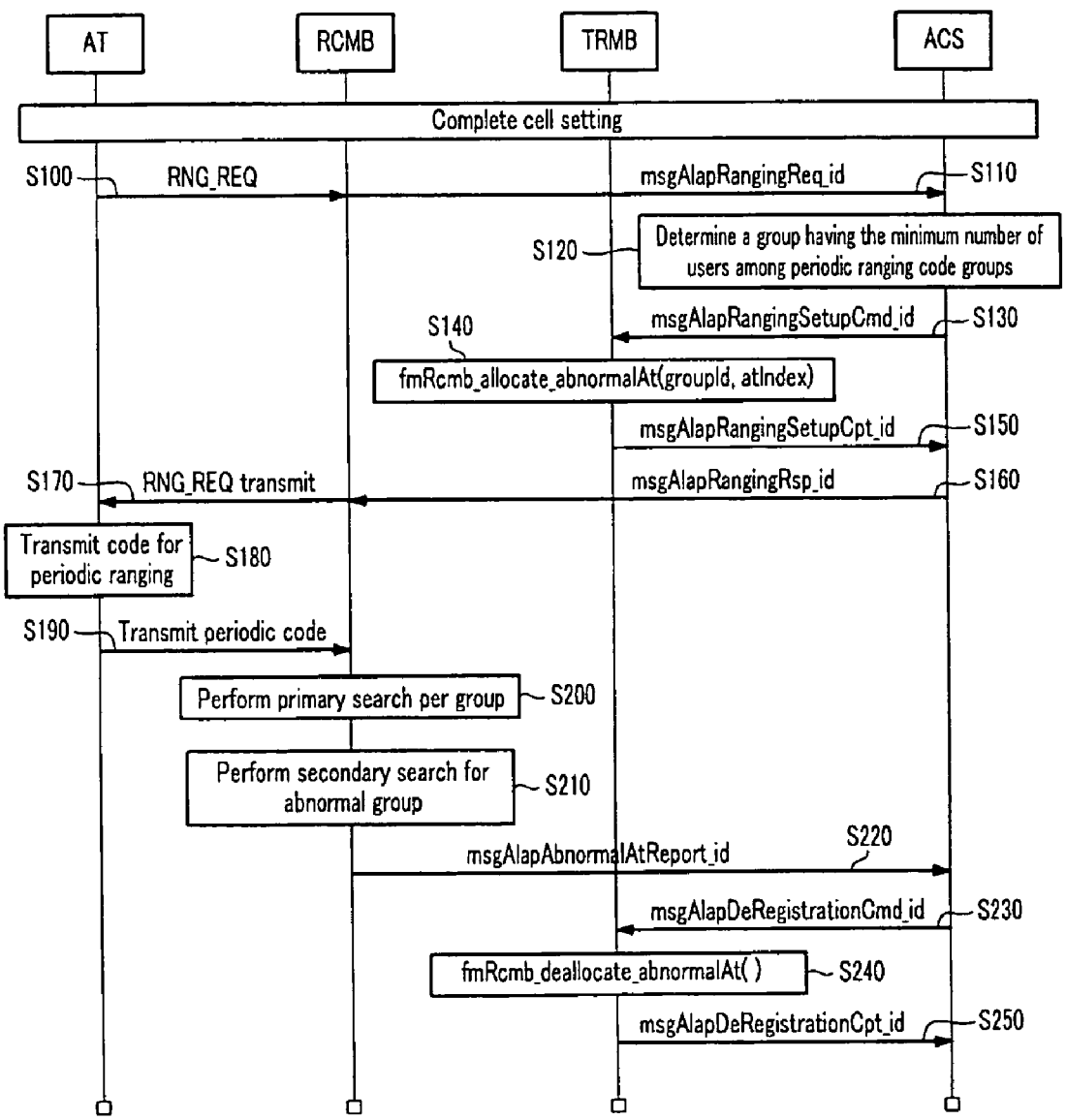
FIG. 6 is a flowchart of an abnormal terminal search and release method according to the exemplary embodiment of the present invention.

FIG. 6 is a flowchart of an abnormal subscriber station search and release method according to the exemplary embodiment of the present invention, and particularly, is a message sequence chart (MSC) showing a message-based operation flow.

The base station 100 transmits uplink radio resource allocation information (i.e., UL-MAP) for transmitting data from each subscriber station and downlink radio resource allocation information (i.e., DL_MAP) for receiving data to the respective subscriber stations through a broadcasting channel, and the UL-MAP/DL-MAP transmission is performed for each frame. The subscriber station receives and stores the broadcasted UL-MAP/DL-MAP, and requests ranging by using the UL-MAP.

As shown in FIG. 6, the subscriber station 200 transmits a ranging request (RNG_REQ) message to the subscriber station 100 for requesting initial ranging information from the base station 100 so as to access the base station 100, and the RNG_REQ message is provided to the ATS 20 in the base station 100, in step S100. When receiving the RNG_REQ from the subscriber station 200, the RCMB 23 of the ATS 20 transmits an internal message (msgAlapRanging_id) including information on the received message to the ACS 30, in step S110.

The ACS 30 selects a group having the minimum number of users among currently used periodic code groups in step S120, and transmits a response message (msgAlapRangingSetupCmd_id) including a group number (i.e., an ID) corresponding to the selected code group to the ATS 20, in step S130.

When receiving the response message, the TRMB 26 of the ATS 20 calls a predetermiried setting function (fnRcmb_allocate_abnomalAt(groupld, atIndex)), and registers information (i.e., subscriber station ID, a periodic ranging code group ID allocated to the subscriber station, etc.) on the corresponding subscriber station a code group information field of the setting function, in step S140. After that, the TRMB 26 transmits a registration completion (msgAlapRangingSetupCmd_id) message indicating completion of registration for the corresponding subscriber station to the ACS 30, in step S150.

The ACS 30 transmits a response message (msgAlapRangingSetupCpt_id) to the ATS 20, responding to the registration completion message, and the RCMB 23 of the ATS 20 generates a ranging response message (RNG_RSP) and transmits the ranging response message RNG_RSP to the subscriber station, responding to the response message, in steps S160 and S170. The ranging response message includes a periodic code group ID allocated to a subscriber station, a frame number, a sub-channel number, and a symbol number.

When receiving the ranging response message RNG_RSP, the subscriber station 200 determines a code group ID allocated to the subscriber station 200, transmits a ranging request message (RNG_REQ) including a ranging code of the corresponding group to the base station 100, and performs a periodic ranging process, in steps S180 and S190.

When receiving the ranging request message RNG_REQ including a ranging code, the RCMB of the ATS 20 sequentially performs the primary search process and the secondary search process so as to search for an abnormal subscriber station based On the RNG_REQ message, in steps S200 and S210. The primary search process and the secondary search process will be described in further detail later.

When a group including an abnormal subscriber station is searched through the primary and secondary search processes and an abnormal subscriber station in the searched group is searched, the RCMB 23 of the ATS 20 transmits a search result message (msgAlapAbnormalAtReport_id) including information on the searched abnormal subscriber station to the ACS 30, in step S220. The ACS 30 transmits a release message (msgAlapDeRegistrationCmd_id) to the ATS 20 so as to release a connection of the abnormal subscriber station according to information included in the search result message, in step S230.

The RCMB 23 of the ATS 20 performs a connection release on the corresponding abnormal subscriber station according to the release message in step S240, and reports a result of the release process by transmitting a release process result message (msgAlapDeRegistrationCpt_id) to the ACS 30, in step S250.

The primary search process will now be described in further detail.

Figure 7:
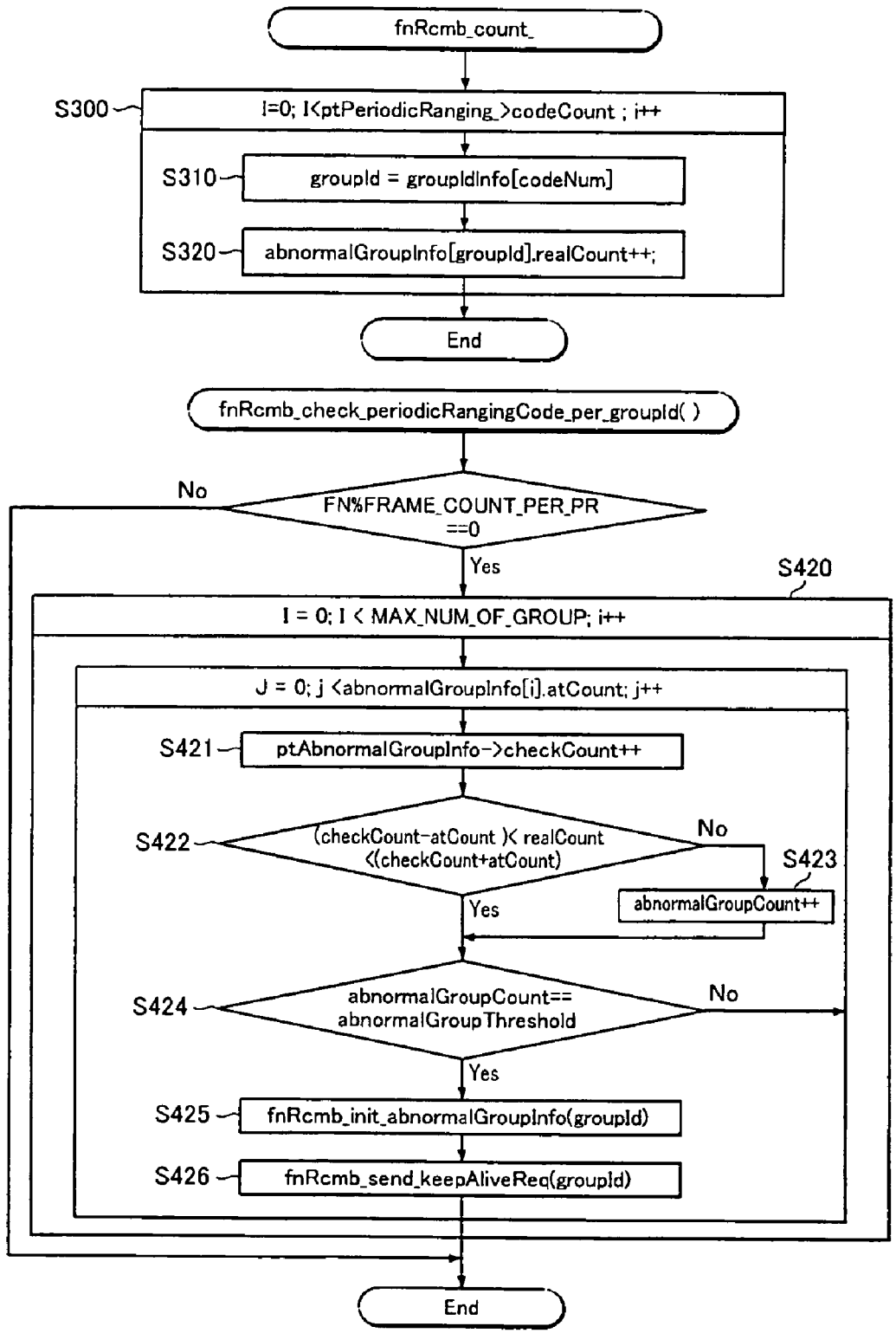
FIG. 7 is a detailed flowchart of a primary searching process according to the exemplary embodiment of the present invention.

FIG. 7 is a flowchart of the primary search process according to the exemplary embodiment of the present invention.

When the ranging request message (RNG_REQ) including a ranging code is received, the first search processing module 233 of the RCMB 23 searches for a group ID by using a periodic ranging code value received per frame and increases a count value as shown in (a) of FIG. 7, accordingly.

In further detail, an ID of a code group including the ranging code is searched based on a value of the ranging code included in the ranging request message (RNG_REQ), in step S310. When the code group ID is searched, a process for increasing a real count (abnormalGroupInfo[groupId]realCount) value by a predetermined amount (e.g., +1) is performed so as to determine whether or not the group is an abnormal group, in step S320. Herein, the real count value is increased when a message having a ranging code included in the corresponding group is received according to periodic ranging, and it is not limited thereto.

As shown in (b) of FIG. 7, the first search processing module 233 forms a frame number included in the received message into a ranging frame count (FRAME_COUNT_PER_PR) module, and determines whether the module value equals "0", in step S410. In this case, the above-stated process is performed not for each frame but for one time or two times of a periodic ranging period so as to increase processing efficiency.

When the value of the frame count module is "0", a check count for determining whether or not all code groups are abnormal by a predetermined value (e.g., +1) is performed, in step S421. Then, the check count and a real count of each group are compared.

In further detail, it is determined whether the real count value satisfies a predetermined condition, in step S422. The predetermined condition is that the real count value is located between a first setting value and a second setting value, the first setting value being obtained by subtracting a current count value from a check count value of the corresponding group, the second setting value being obtained by adding a current count value to the check count value.

When a real count value of a predetermined group does not satisfy the predetermined condition, it is determined that the corresponding group includes an abnormal subscriber station so that an abnormal group count (abnormalGroupCount) is increased by a predetermined value (e.g., +1), in step S423. When the real count value of the predetermined group satisfies the predetermined condition, it is determined that the corresponding group does not include an abnormal subscriber station.

The abnormal group count (abnormalGroupCount) value is compared with a predetermined threshold value (abnormalGroupThreshold) in step S424, and the above-state processes (S421 to S423) are repeated until the abnormal group count value satisfies the predetermined threshold value.

When the abnormal group count value reaches the predetermined threshold value, the primary search process is terminated and parameters storing abnormal group information are initialized (fnRcmb_init_abnormalGrouplnfo(groupld)), in step S425.

The second search processing module 234 of the RCMB 23 performs a secondary search process and transmits a connection maintenance request message to each subscriber station of a group that has been determined as an abnormal group including an abnormal subscriber station according to the primary search process.

When the group including the abnormal subscriber station is searched by performing the primary search process, the secondary search process to search an abnormal subscriber station in the searched group is performed as further described in the following.

Figure 8:
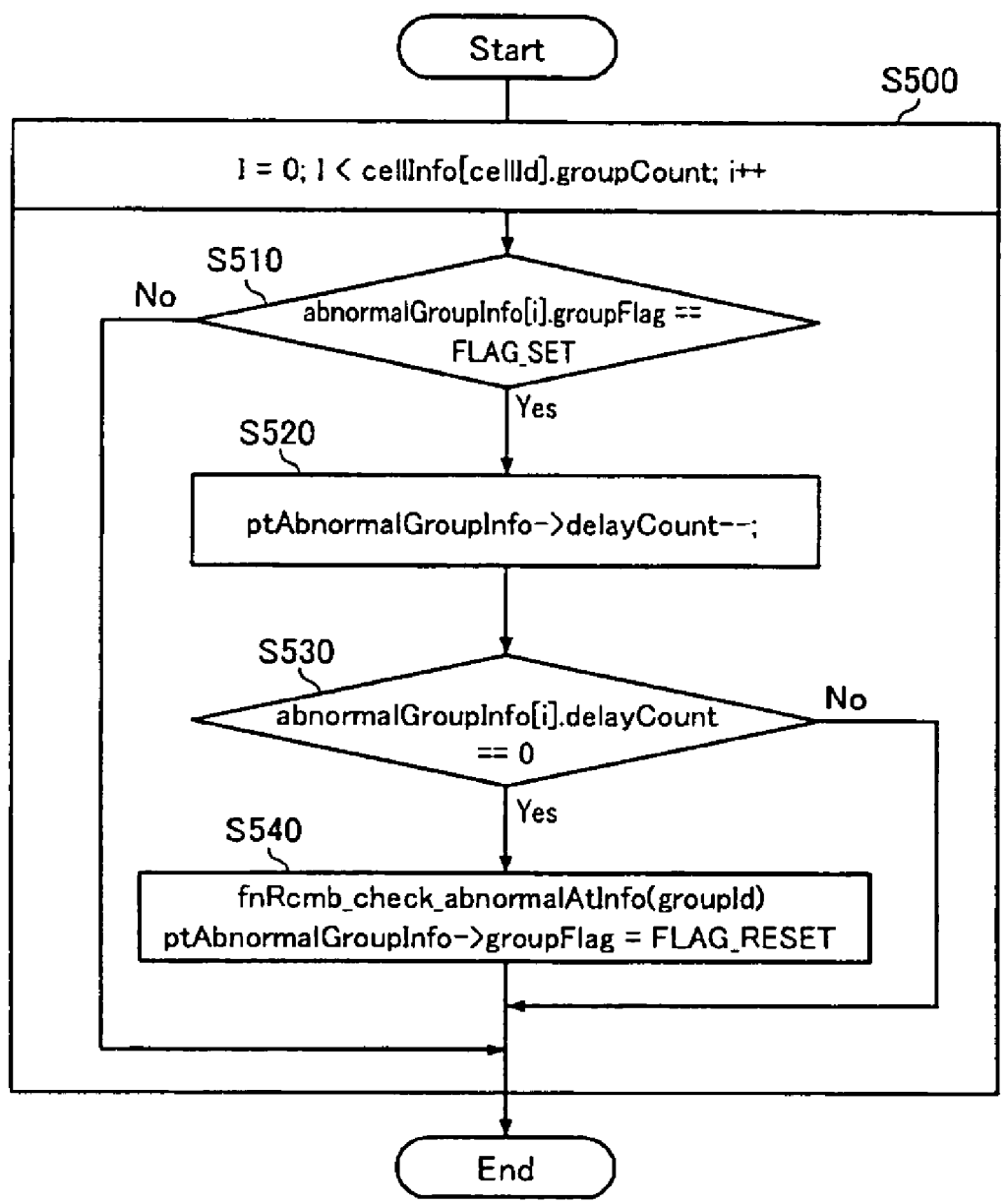
FIG. 8 shows a detailed flowchart of a secondary searching process according to the exemplary embodiment of the present invention.

FIG. 8 is a flowchart of the secondary search process according to the exemplary embodiment of the present invention.

According to the exemplary embodiment of the present invention, the secondary search process is repeated until a group count, particularly a delay count (delaycount) value among cell information, equals "0". In further detail, the second search processing module 23 of the RCMB 23 determines whether a group flag (abnormalGrouplnfo[i].groupFlag) is set in information of the abnormal group, and reduces a value of a delay count delaycount in the information by a predetermined amount (e.g., +1) when the group flag is set to FLAG_SET, in steps S510 andS520.

Figure 9:
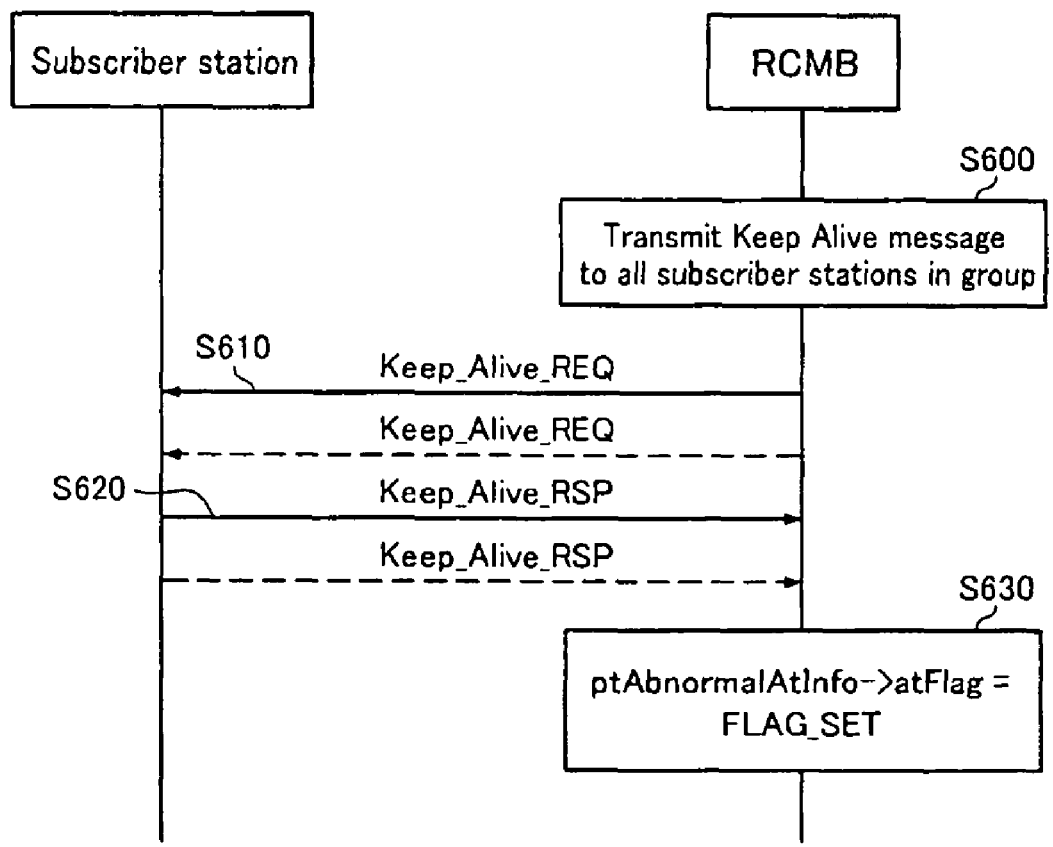
FIG. 9 is a detailed flowchart of a group flag setting process of FIG. 8.

The group flag is set to FLAG-SET when a connection maintenance response message for the connection maintenance request message is transmitted from subscriber stations included in the abnormal group. FIG. 9 shows a group flag setting process.

As shown in FIG. 9, the connection maintenance request message (Keep_Alive_Req) is transmitted to all subscriber stations in the group that has been determined as the abnormal group through the primary search process, in steps SS600 and S610. When a connection maintenance response message (Keep_Alive_Rsp) is transmitted from a predetermined subscriber station in step S620, the RCMB 23 determines that the corresponding subscriber station is normal and sets a flag atFlag of an information field ptAbnormalAtInfo of the subscriber station to FLAG_SET, in step S630. Through the above-stated processes, a status of each subscriber station in the abnormal group is determined so that an abnormal subscriber station and a normal subscriber station can be classified.

In addition, a group flag abnormalGroupInfo[i].groupFlag for an abnormal group in which a corresponding subscriber station is included may be set to FLAG_SET depending on flag setting of the respective subscriber stations (i.e., when a connection maintenance response message is transmitted from a normal subscriber station).

After setting the corresponding group flag to FLAG_SET and decrementing the value of the delay count delayCount thought the above-stated processes, the second search processing module 234 determines whether the value of the decremented delay count equals "0", in step S530.

When the delay count value of the abnormal group equals "0", a secondary search checking process (fnRcmb_check_abnormalAtInfo(groupId)) is performed on the abnormal subscriber station and the corresponding group flag is reset (FLAG_RESET), in step S540.

Figure 10:
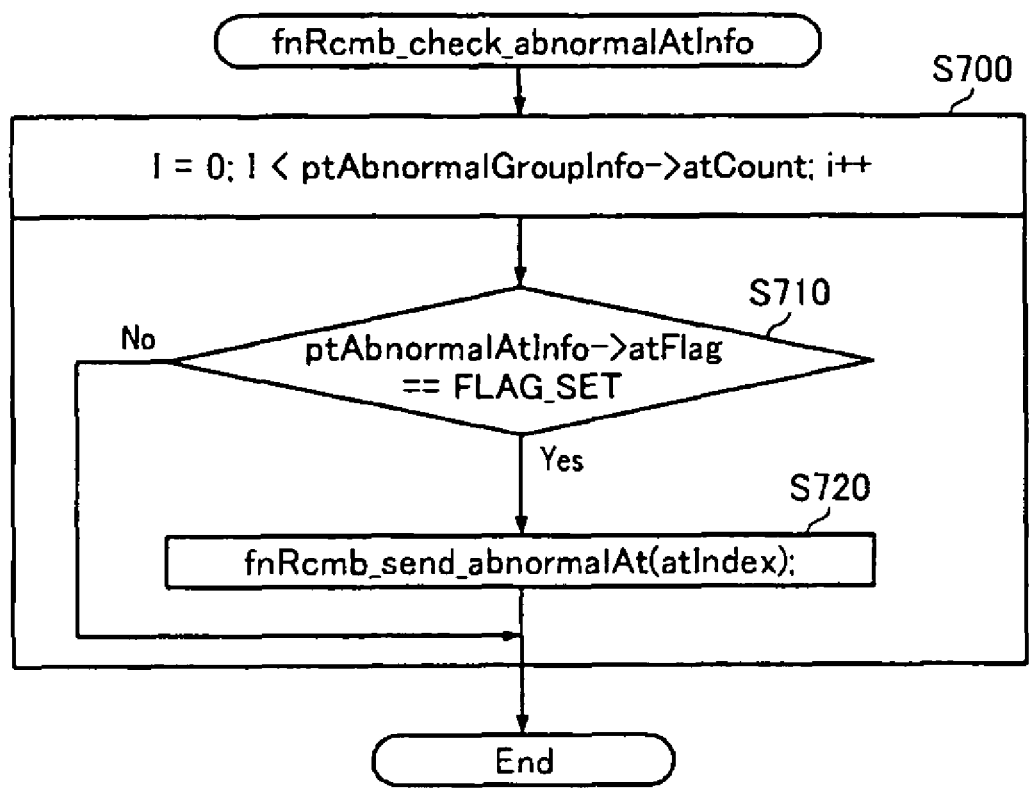
FIG. 10 is a detailed flowchart of a secondary searching and determining process of FIG. 8.

FIG. 10 is a detailed-flowchart of the secondary search checking process fnRcmb_check_abnormalAtInfo. This process re-checks an abnormal subscriber station by determining whether a flat atFlag in an information field abnormalAtInfo of each subscriber is set to FLAG_SET, in Step S710. When it is determined that the flag atFlag is set to FLAG_SET, the second search processing module 234 finally determines that the corresponding, subscriber station is an abnormal subscriber station and performs the fnRcmb_send_abnormalAt, in step S720. That is, the second search processing module 234 transmits information on the abnormal subscriber station to the ACS 30.

Therefore, the ACS 30 releases a connection of ah abnormal subscriber station and terminates the resource allocation process as shown in FIG. 6 based on the abnormal subscriber station information provided from the RCMB 23 of the ATS 20.

As described above, the periodic ranging function performed to periodically report a status of a subscriber station is managed for each group, and this group including an abnormal subscriber station is primarily searched. After that, the Keep_alive_req message is transmitted only to a subscriber station included in the searched group and an abnormal subscriber station is secondarily searched. Information of the abnormal subscriber station is transmitted to the ACS so as to release the corresponding abnormal subscriber station to thereby prevent radio resource waste of the system due to the existence of the abnormal subscriber station, and efficiently use the corresponding resources.

Figure 11:
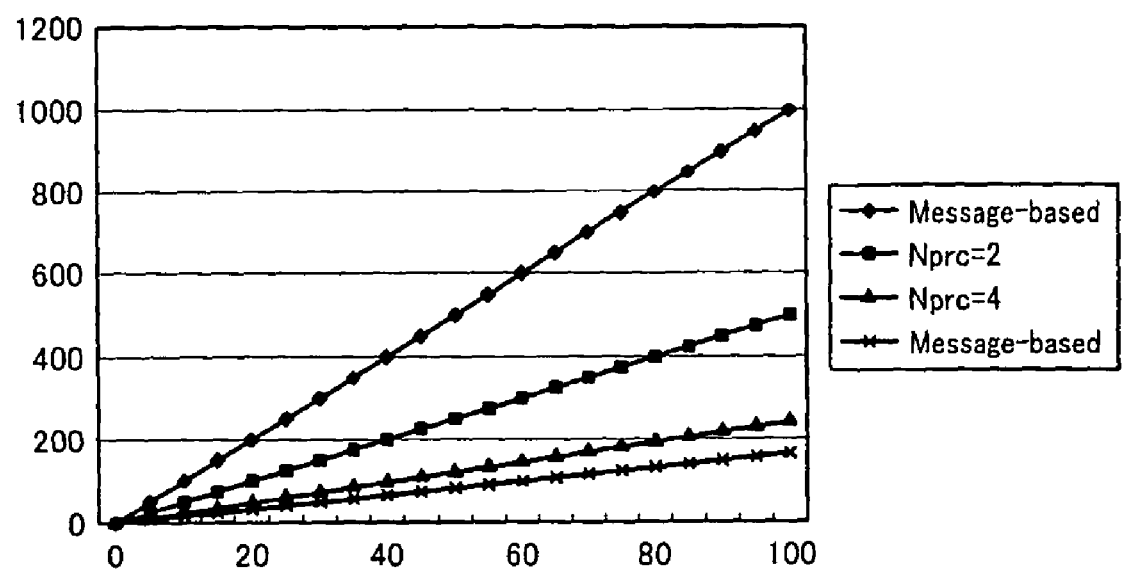
FIG. 11 is a graph showing radio resources required for searching and releasing the abnormal terminal according to the exemplary embodiment of the present invention.

FIG. 11 is a graph showing radio resources required for searching and releasing an abnormal subscriber station according to the exemplary embodiment of the present invention. That is, the amount of radio resources required for searching an abnormal subscriber station by using a conventional message-based searching and releasing method is compared with the amount of radio resources required for searching and releasing an abnormal subscriber station by using the periodic ranging function according to the exemplary embodiment of the present invention in the graph.

Table 1 shows parameters required for calculating the amount of radio resources consumed to search an abnormal subscriber station by using the periodic ranging function according to the exemplary embodiment of the present invention.

TABLE 1

| Parameter | Description |
| --- | --- |
| $N_{PRC}$ | The number of periodic ranging codes in one cell |
| $N_{USER}$ | The number of currently served users in one cell |
| $N_{FPR}$ | The number of users per periodic ranging code in one cell |
| $T_{KAF}$ | Time interval for searching an abnormal subscriber station |
| $C_{KA}$ | The size of message searching an abnormal subscriber station |
| $C_{TKA}$ | Total amount of radio resources used in a period for searching an abnormal subscriber station |
| $T_{Drame}$ | The number of currently performed frames |

An allocation amount of radio resources required for searching an abnormal subscriber station is calculated through message-based Equation 1 and Equation 2 that uses a periodic ranging code.

$$C_{KA} \times N_{USER} = C_{TKA} \quad \text{[Equation 1]}$$

$$N_{USER}/N_{PRC} = N_{UFPR}$$

$$N_{UFPC} \times C_{KA} = C_{TKA} \quad \text{[Equation 2]}$$

The amount of radio resources calculated through Equation 1 and Equation 2 are shown in the graph of FIG. 11, and the graph of FIG. 11 shows that the periodic ranging function consumes significantly less radio resources for searching and releasing an abnormal subscriber station than the conventional method. Therefore, radio resource waste can be prevented and efficient resource management can be achieved.

A method for searching and releasing, including the above-stated processes can be realized in a program format stored in a computer-readable recording medium. The recording medium may include all types of computer-readable recording apparatuses, such as a CD-ROM, a magnetic tape, and a floppy disk, and the recording medium also can be realized in the form of a carrier wave (e.g., transmission through the Internet).

According to the above-described embodiment of the present invention, the wireless portable Internet system performs the primary and secondary search processes by using a periodic ranging function that periodically reports a status of a subscriber station, and performs message transmission/receiving for determining whether a subscriber station included in an abnormal group is an abnormal subscriber station so as to prevent radio resource waste and achieve efficient resource management.

In addition, the secondary search process is performed only to subscriber stations included in an abnormal group, thereby preventing a system load for searching abnormal subscriber stations.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for searching and releasing an abnormal subscriber station in a wireless communication system, the method comprising:
   allocating one group number from among periodic ranging code groups to a subscriber station upon receiving a ranging request of the subscriber station, and transmitting the allocated group number and a corresponding ranging code to the subscriber station;
   determining a ranging code group that includes the ranging code when a ranging request message including the ranging code is transmitted from the subscriber station;
   classifying and processing the ranging request message for the ranging code group and searching for an abnormal group that includes the abnormal subscriber station from among the ranging code groups;
   transmitting a connection maintenance request message only to subscriber stations included in the abnormal group to determine an operation status of each of the subscriber stations included in the abnormal group and searching for the abnormal subscriber station in the abnormal group in accordance with the determined operation statuses; and
   releasing a connection of the abnormal subscriber station.

2. The method of claim 1, wherein the searching for the abnormal group comprises:
   increasing a value of a real count of the ranging code group having the ranging code that is included in the ranging request message by a predetermined amount;
   forming a frame number including the ranging request message into a module, and increasing a check count value when a value of the module satisfies a predetermined threshold value;
   determining whether the real count value satisfies a predetermined range formed by a first setting value and a second setting value that are calculated based on the check count value; and
   determining a code group having the real count value to be an abnormal group including an abnormal subscriber station when the real count value satisfies the predetermined range.

3. The method of claim 2, wherein the real count value is increased by the predetermined amount based on the ranging request message received per frame and the abnormal group and the abnormal subscriber station are sought with a predetermined searching interval.

4. The method of claim 1, wherein searching for the abnormal subscriber station comprises:
   transmitting the connection maintenance request message to all subscriber stations in the abnormal group;
   when a connection maintenance response message is transmitted from a predetermined subscriber station responding to the connection maintenance request message, determining the predetermined subscriber station to be a normal subscriber station; and
   determining a subscriber station that does not transmit the connection maintenance response message to be the abnormal subscriber station.

5. The method of claim 4, wherein transmitting of the ranging code to the subscriber station comprises allocating the group number having a minimum number of users among a plurality of group numbers to the subscriber station.

6. An apparatus for searching for an abnormal subscriber station and releasing the abnormal subscriber station in a wireless communication system, the apparatus comprising:
   an access controller for allocating one group number from among periodic ranging code group numbers to a subscriber station upon receiving a ranging request of the subscriber station, and transmitting the allocated group number and a corresponding ranging code to the subscriber station; and
   an access traffic processor for searching for the abnormal subscriber station based on a ranging request message including the ranging code when the ranging request message is transmitted from the subscriber station,
   wherein the access traffic processor comprises:
   a first search processing module for classifying and processing the ranging request message for the ranging code group and searching for an abnormal group that includes the abnormal subscriber station from among the ranging code groups, and
   a second search processing module for transmitting a connection maintenance message only to subscriber stations included in the abnormal group for determining an operation status of each of the subscriber stations in the abnormal group, and searching for the abnormal subscriber station in the abnormal group in accordance with the determined operation statuses.

7. The apparatus of claim 6, wherein the second search processing module transmits information on the abnormal subscriber station to the access controller, and releases a connection of the abnormal subscriber station based on the information.

8. The apparatus of claim 7, wherein the access traffic processor further comprises:
   a first ranging module for transmitting a response message including the ranging code provided from the access controller to the subscriber station according to a ranging information request of the subscriber station; and
   a second ranging module for transmitting a response message to the subscriber station in response to the ranging request message including the ranging code, the response message including transmit power, transmit timing, and frequency offset of an uplink.

9. The apparatus of claim 7, wherein the second search processing module determines a subscriber station that transmits a connection maintenance response message responding to the connection maintenance request message to be a normal subscriber station, and determines a subscriber station that does not transmit the connection maintenance response message to be the abnormal subscriber station.

* * * * *